(12) United States Patent
Hikita

(10) Patent No.: US 11,554,612 B2
(45) Date of Patent: *Jan. 17, 2023

(54) TYRE

(71) Applicant: Sumitomo Rubber Industries, Ltd., Kobe (JP)

(72) Inventor: Masahiro Hikita, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 340 days.

This patent is subject to a terminal disclaimer.

(21) Appl. No.: 16/793,903

(22) Filed: Feb. 18, 2020

(65) Prior Publication Data

US 2020/0282775 A1 Sep. 10, 2020

(30) Foreign Application Priority Data

Mar. 5, 2019 (JP) ............................. JP2019-039632

(51) Int. Cl.
- *B60C 11/03* (2006.01)
- *B60C 11/117* (2006.01)
- *B60C 11/13* (2006.01)

(52) U.S. Cl.
CPC ..... *B60C 11/032* (2013.01); *B60C 2011/0376* (2013.01); *B60C 2011/0379* (2013.01)

(58) Field of Classification Search
CPC ..................... B60C 11/032; B60C 11/0323
See application file for complete search history.

(56) References Cited

U.S. PATENT DOCUMENTS

| | | | | |
|---|---|---|---|---|
| 2,327,057 A | * | 8/1943 | Ofensend | B60C 11/042 152/209.21 |
| D718,701 S | * | 12/2014 | Isaka | D12/535 |
| D748,040 S | * | 1/2016 | Lucas | D12/535 |
| 2012/0216929 A1 | * | 8/2012 | Matsunami | B60C 11/0302 152/209.11 |

(Continued)

FOREIGN PATENT DOCUMENTS

| | | | |
|---|---|---|---|
| CN | 104029567 A | * | 9/2014 |
| GB | 2 114 069 A | | 8/1983 |

(Continued)

OTHER PUBLICATIONS

Machine Translation: CN-104029567-A, Chen X, (Year: 2022).*
(Continued)

*Primary Examiner* — Kendra Ly
(74) *Attorney, Agent, or Firm* — Birch, Stewart, Kolasch & Birch, LLP

(57) ABSTRACT

To improve uneven wear resistance performance while maintaining drainage performance. A tyre is provided with a plurality of inclined grooves in a tread portion. Each of the inclined grooves extends from a crown region to a shoulder region. Each of the inclined grooves includes a first portion arranged on the crown region side, a second portion arranged on the shoulder region side, and a third portion connecting between the first portion and the second portion. The third portion has a groove width smaller than the first portion and the second portion. The first portion, the second portion, and the third portion are inclined to the same side with respect to the tyre circumferential direction.

20 Claims, 6 Drawing Sheets

(56) References Cited

U.S. PATENT DOCUMENTS

| | | | |
|---|---|---|---|
| 2012/0241060 A1* | 9/2012 | Hayashi | B60C 11/0302 |
| | | | 152/209.8 |
| 2014/0158260 A1* | 6/2014 | Kuwahara | B60C 11/0304 |
| | | | 152/209.8 |
| 2014/0190607 A1* | 7/2014 | Matsunami | B60C 11/1369 |
| | | | 152/209.11 |
| 2016/0075187 A1 | 3/2016 | Kubo et al. | |
| 2017/0120692 A1* | 5/2017 | Durand-Gasselin | |
| | | | B60C 11/0306 |

FOREIGN PATENT DOCUMENTS

| | | | | | |
|---|---|---|---|---|---|
| GB | 2114069 A | * | 8/1983 | | B60C 11/0302 |
| JP | 2007223569 A | * | 9/2007 | | B60C 11/0058 |
| JP | 2014-218194 A | | 11/2014 | | |
| WO | WO 2017/064585 A1 | | 3/2017 | | |
| WO | WO 2017/064585 A1 | | 4/2017 | | |

OTHER PUBLICATIONS

Machine Translation: JP-2007223569-A, Kajimoto K, (Year: 2022).*
Extended European Search Report dated Jul. 3, 2020 for Application No. 20153844.4.

* cited by examiner

TYRE

TECHNICAL FIELD

The present invention relates to a tyre.

BACKGROUND ART

Patent Document 1 below has described a motorcycle tyre provided with a central inclined groove arranged in the vicinity of a tyre equatorial plane and extending obliquely and outwardly in a tyre width direction from the tyre equatorial plane side. A rotational direction of the motorcycle tyre is specified. In the central inclined groove, at an end portion thereof, an outer groove edge in the tyre width direction is formed by an arc-shaped portion, and a groove depth thereof is gradually decreased in the reverse rotational direction.

PRIOR ART DOCUMENT

Patent Document

Patent Document 1

Japanese Patent Application Publication No. 2014-218194

SUMMARY OF THE INVENTION

Problems to be Solved by the Invention

In recent years, due to the development of the highway network, straightaway driving time has been increasing. In addition, driving speed has been increasing due to the improved performance of vehicles. For this reason, there has been a problem that a specific area in the tread portion of the tyre is worn a lot. Further, there has been a demand for maintaining drainage performance so that the hydroplaning phenomenon does not occur even at a high driving speed.

The present invention was made in view of the above, and a primary object thereof is to provide a tyre capable of improving uneven wear resistance performance while maintaining the drainage performance.

Means for Solving the Problems

The present invention is a tyre including a tread portion and the tread portion is provided with a plurality of inclined grooves inclined with respect to a tyre circumferential direction, wherein extends from a crown region to a shoulder region, each of the inclined grooves includes a first portion arranged on the crown region side, a second portion arranged on the shoulder region side, and a third portion connecting between the first portion and the second portion, the third portion has a groove width smaller than the first portion and the second portion, and the first portion, the second portion, and the third portion are inclined to the same side with respect to the tyre circumferential direction.

In the tyre according to the present invention, it is preferred that the third portion is arranged, when the tyre is placed on a flat surface and loaded with a tyre load of 1.5 kN with zero camber angles, so as to be in contact with the flat surface.

In the tyre according to the present invention, it is preferred that the third portion extends linearly.

In the tyre according to the present invention, it is preferred that in terms of a groove volume per unit area, the third portion is 20% or more of the first portion and the second portion.

In the tyre according to the present invention, it is preferred that in terms of the groove width, the third portion is 60% or less of the first portion and the second portion.

In the tyre according to the present invention, it is preferred that in terms of a groove depth, the third portion is 80% or more and 120% or less of the first portion and the second portion.

In the tyre according to the present invention, it is preferred that a length in a tyre axial direction of the third portion is 5% or more of a tread width.

In the tyre according to the present invention, it is preferred that a groove wall on one side in the tyre circumferential direction of the third portion is connected with a groove wall on one side in the tyre circumferential direction of the first portion and/or a groove wall on one side in the tyre circumferential direction of the second portion in a straight line or in a bent manner.

In the tyre according to the present invention, it is preferred that the groove wall on one side is arranged on a toe-side in a tyre rotational direction.

In the tyre according to the present invention, it is preferred that the groove wall on one side is arranged on a heel-side in a tyre rotational direction.

In the tyre according to the present invention, it is preferred that a length in a tyre axial direction of the first portion is smaller than a length in the tyre axial direction of the second portion.

In the tyre according to the present invention, it is preferred that the inclined grooves include at least one first inclined groove and at least one second inclined groove having a length smaller than the first inclined groove.

In the tyre according to the present invention, it is preferred that the first portion of the first inclined groove reaches a tyre equator and the first portion of the second inclined groove does not reach the tyre equator.

Effects of the Invention

In the tyre according to the present invention, the tread portion is provided with a plurality of the inclined grooves extending from the crown region to the shoulder region, therefore, excellent drainage performance is exerted.

Each of the inclined grooves, owing to the third portion having the small groove width, maintains a tread rigidity in the vicinity of the inclined groove high, therefore, the uneven wear resistance performance is improved. Further, since the third portion is connected with the first portion and the second portion, slippage while the first portion and the second portion are in contact with the ground is suppressed, therefore, the uneven wear resistance performance is further improved. The first portion and the second portion of each of the inclined grooves have the large groove widths, therefore, the drainage performance is maintained high.

The first portion, the second portion, and the third portion are inclined to the same side with respect to the tyre circumferential direction. Thereby, since the smooth flow of the water in the inclined grooves is ensured, the drainage performance is maintained high.

MODE FOR CARRYING OUT THE INVENTION

An embodiment of the present invention will now be described in conjunction with accompanying drawings.

Figure 1:
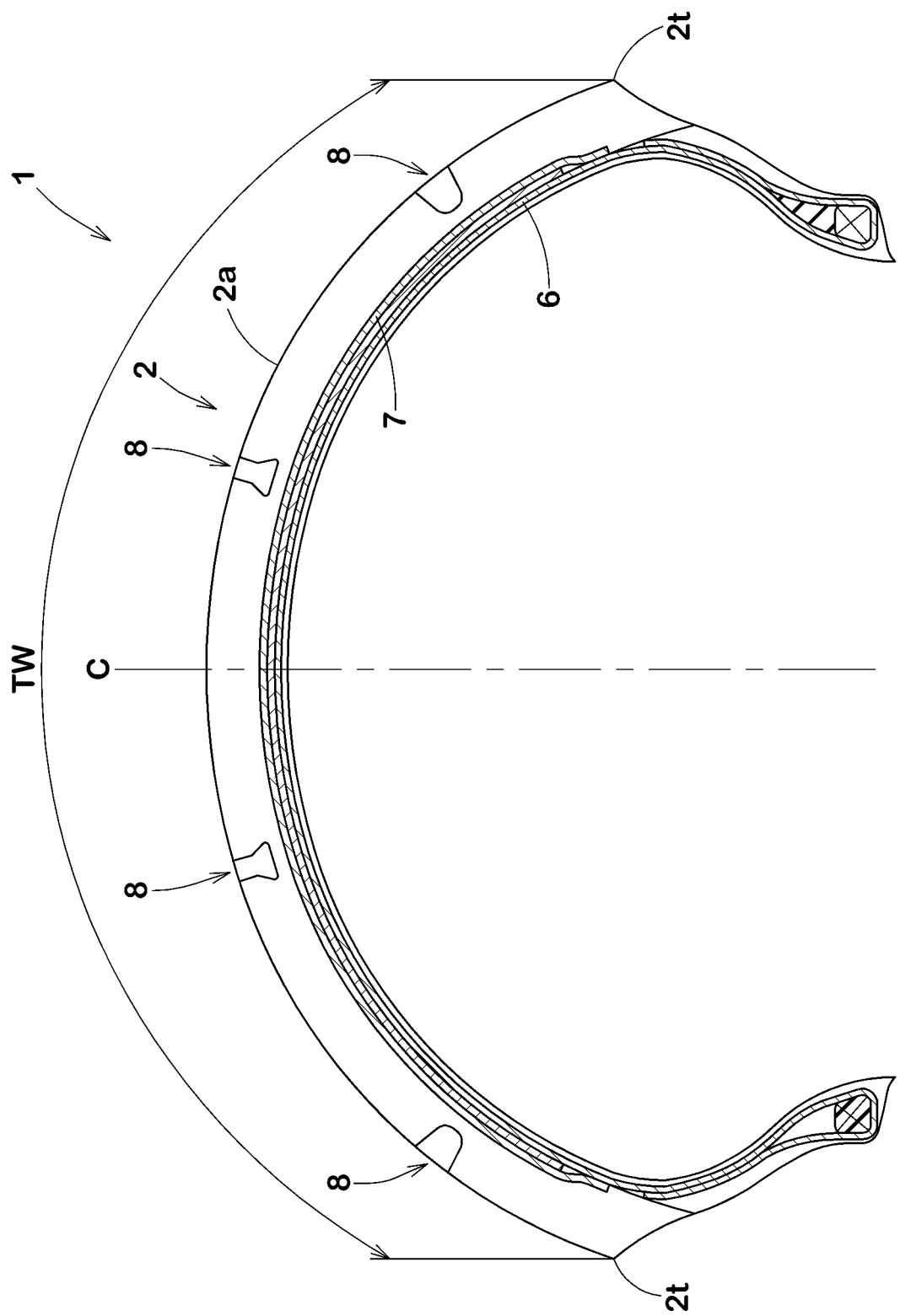
FIG. 1 a tyre meridian section of a tyre according to an embodiment of the present embodiment.

FIG. 1 is a tyre meridian section passing through a tyre rotational axis (not shown) of a tyre 1 according to the present embodiment in a standard state. In FIG. 1, the pneumatic tyre 1 for a motorcycle is shown, for example. However, the present invention is not limited to the tyre 1 configured as such, and may be applied to a pneumatic tyre 1 for passenger cars and for heavy loads, as well as a non-pneumatic tyre 1 that is not filled with air, for example.

The "standard state" is a state in which the tyre 1 is mounted on a standard rim (not shown), inflated to a standard inner pressure, and loaded with no tyre load. In this specification, dimensions and the like of various parts of the tyre are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

In the tyre 1 of the present embodiment, a ground contacting surface (2a) defined between tread edges (2t), (2t) of a tread portion 2 extends in a curved arc shape protruding outward in a tyre radial direction. In the tyre 1 configured as such, a sufficient ground contacting area can be obtained even during cornering with a large camber angle. In this specification, a distance in a tyre axial direction between the tread edges (2t), (2t) when the tread portion 2 is developed into a plane is defined as a tread width (Tw).

The tread portion 2 of the present embodiment has a carcass 6 and a tread reinforcing layer 7 disposed therein. Each of the carcass 6 and the tread reinforcing layer 7 are formed as a cord ply in which a plurality of cords is arranged and covered with a topping rubber, for example.

Figure 2:
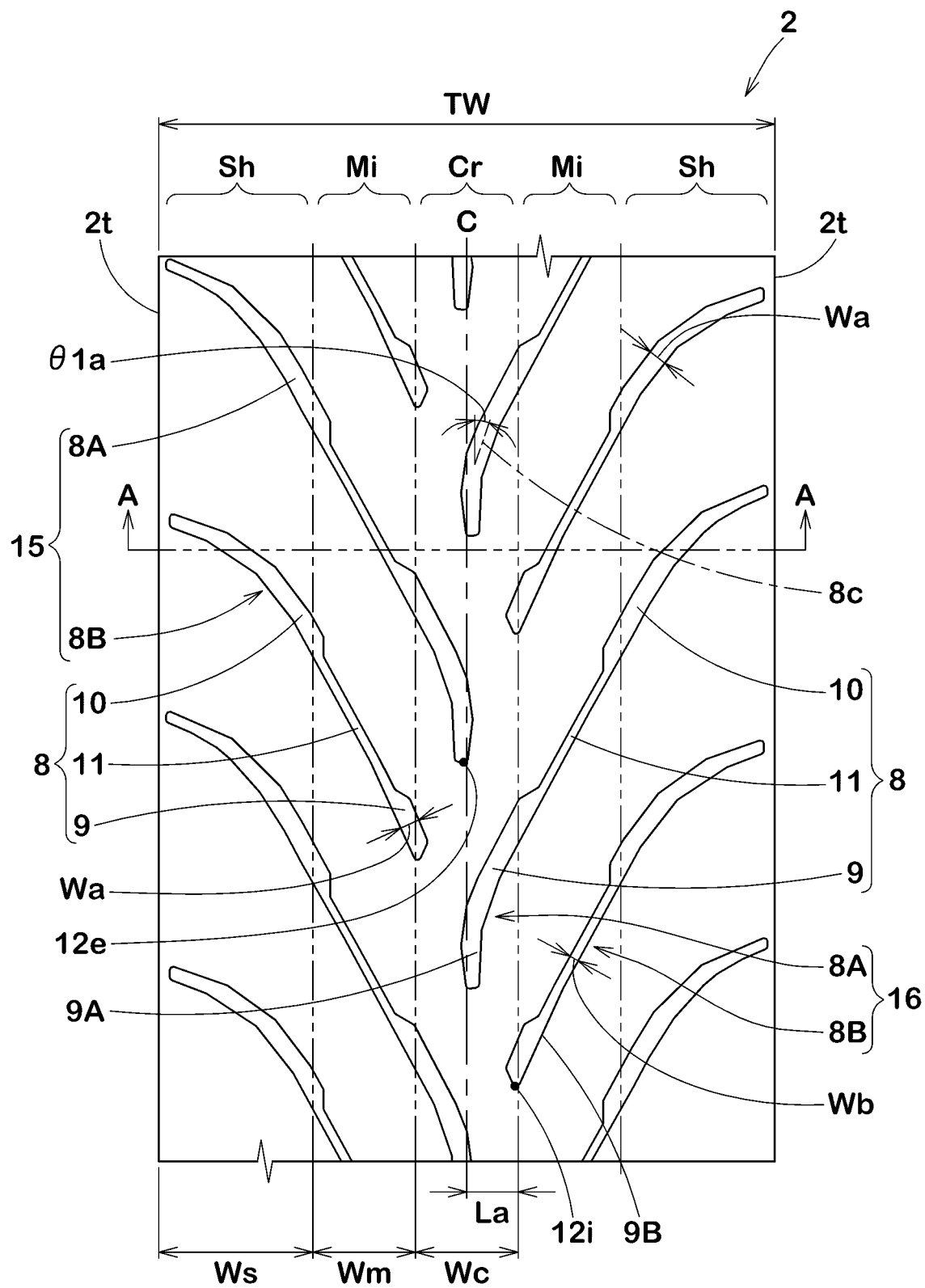
FIG. 2 a development view of the tread portion of the tyre of FIG. 1.

FIG. 2 is a development view of the tread portion 2 of the tyre 1 of the present embodiment. A cross section taken along A-A line of FIG. 2 is shown in FIG. 1. As shown in FIG. 2, the tread portion 2 of the present embodiment includes a crown region (Cr) including a tyre equator (C), a pair of middle regions (Mi), (Mi) disposed on both sides of the crown region (Cr), and a pair of shoulder regions (sh), (sh) each arranged axially outside a respective one of the middle regions (Mi). The crown region (Cr) and the middle regions (Mi) are the regions which are to be in contact with a flat plane (not shown) when the tyre 1 in the standard state is loaded with a tyre load of 1.5 kN with zero camber angle. Both regions (Cr) and (Mi) are the regions which generally contact with the ground during straightaway driving. Note that each of the middle regions (Mi) has a smaller length in a tyre circumferential direction than that of the crown region (Cr), therefore, the amount of wear due to slip tends to be increased. The shoulder regions (sh) include the tread edges (2t), and are the regions which come into contact with the ground during cornering when the camber angle becomes maximum.

Although not particularly limited, a width (Wc) in the tyre axial direction of the crown region (Cr) is 10% or more and 20% or less of the tread width (Tw), for example. A width (Wm) in the tyre axial direction of each of the middle regions (Mi) is 15% or more and 20% or less of the tread width (Tw), for example. A width (ws) in the tyre axial direction of each of the shoulder regions (sh) is 20% or more and 30% or less of the tread width (Tw), for example.

The tread portion 2 of the present embodiment is provided with a plurality of inclined grooves 8 inclined with respect to the tyre circumferential direction. Each of the inclined grooves 8 extends over the crown region (Cr) and the shoulder region (sh), thereby, high drainage performance is exerted.

Each of the inclined grooves 8 includes a first portion 9 arranged on a side of the crown region (Cr), a second portion 10 on a side of a corresponding one of the shoulder regions (sh), and a third portion 11 connecting between the first portion 9 and the second portion 10. The third portion 11 has a groove width (wb) smaller than the first portion 9 and the second portion 10. The third portion 11 configured as such maintains the tread rigidity in the vicinity thereof, therefore, the uneven wear resistance performance is improved. Further, since the third portion 11 connects between the first portion 9 and the second portion 10, slippage (mainly occurs in the tyre circumferential direction) when the first portion 9 and the second portion 10 are in contact with the ground is suppressed, therefore, the uneven wear resistance performance is improved. In particular, in the case in which the cords of the tread reinforcing layer 7 are arranged at zero degrees with respect to the tyre equator (C), the effect of suppressing the slippage in the tyre circumferential direction is increased. since the first portion 9 and the second portion 10 have a large groove width (wa), the drainage performance is maintained high.

The first portion 9, the second portion 10 and the third portion 11 are inclined in the same direction with respect to the tyre circumferential direction. Thereby, since the smooth flow of the water in the inclined grooves 8 is ensured, the drainage performance is maintained high.

The inclined grooves 8 include inclined grooves 15 on one side which extend from the crown region (Cr) toward one of the shoulder regions (sh) on one side in the tyre axial direction (left side in the figure) and inclined grooves 16 on the other side which extend from the crown region (Cr) toward one of the shoulder regions (sh) on the other side in the tyre axial direction (right side in the figure), for example. The inclined grooves 15 on one side and the inclined grooves 16 on the other side in the present embodiment are alternately arranged in the tyre circumferential direction.

In the present embodiment, the inclined grooves 8 include first inclined grooves (8A) and second inclined grooves (8B) having lengths smaller than those of the first inclined grooves 8A. The first inclined grooves (8A) and the second inclined grooves (8B) are alternately arranged in the tyre circumferential direction, for example.

The first portions (9A) of the first inclined grooves (8A) reach the tyre equator (C), and the first portions (9B) of the second inclined grooves (8B) do not reach the tyre equator (C). The inclined grooves 8 configured as such suppress a large decrease in the tread rigidity on the tyre equator (C) where a large ground contact pressure is applied to, therefore, the uneven wear resistance performance is maintained. In the present embodiment, the first portions (9A) of the first inclined grooves (8A) have lengths greater than the first portions (9B) of the second inclined grooves (8B).

Inner ends (12e) of the first inclined grooves (8A) are located on the tyre equator (C), for example. A distance (La) in the tyre axial direction between inner ends (12i) of the second inclined grooves (8B) and the tyre equator (C) is 5% or more and 10% or less of the tread width (Tw), for example. Thereby, the effects described above are effectively exerted.

In the present embodiment, each of the first portions 9 extends over the crown region (Cr) and one of the middle regions (Mi). The first portions 9 configured as such quickly discharge water on the crown region (Cr) where water is difficult to be drained. In the present embodiment, each of the first portions 9 of the first inclined grooves (8A) has a length in the tyre axial direction larger than a half of the width (wc) of the crown region (Cr).

The first portions (9A) of the first inclined grooves (8A) are inclined so that the angles (θ1a) with respect to the tyre circumferential direction increases axially outwardly, for example. The first portions (9B) of the second inclined grooves (8B) extend linearly, for example. In this specification, the angle of each of the inclined grooves 8 is measured at a groove center line (8c) thereof.

In the present embodiment, each of the second portions extends over one of the shoulder regions (sh) and its adjacent one of the middle regions (Mi). The second portions 10 configured as such improve the drainage performance during cornering. The second portions 10 in the present embodiment terminate within the shoulder regions (sh) without being connected to the tread edges (2t). Thereby, the tread rigidity on sides of the tread edges (2t) is maintained high.

Figure 3:
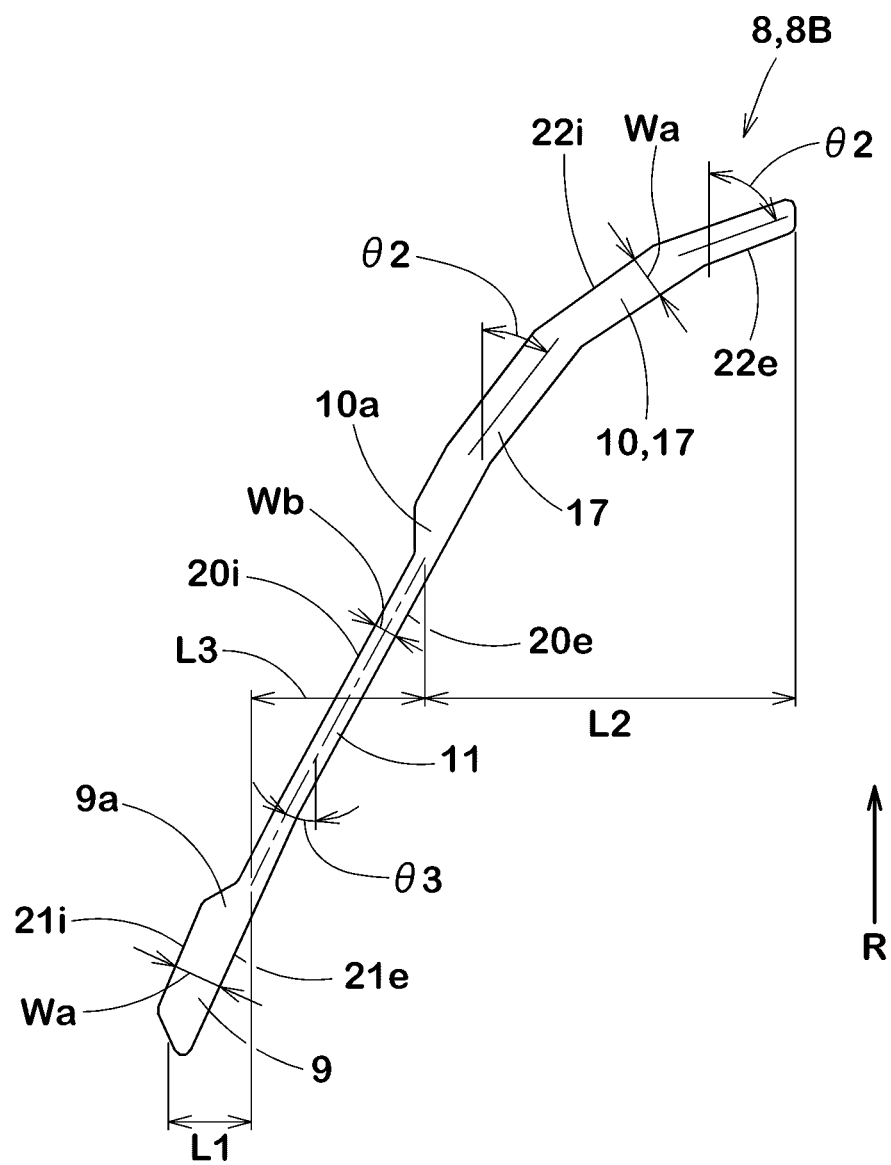
FIG. 3 an enlarged view of the inclined groove of FIG. 1.

FIG. 3 is an enlarged view of the inclined groove 8. As shown in FIG. 3, the second portion 10 in the present embodiment is formed by a plurality of linear portions 17 extending linearly and connected successively. Angles (θ2) of the linear portions 17 with respect to the tyre circumferential direction are larger axially outwardly. The second portions 10 configured as such increase the groove volumes and maintains the tread rigidity high in the tyre axial direction of the shoulder regions (sh) where a large lateral force is applied to. It should be noted that the second portion 10 may be formed in a smooth circular arc shape convex toward one side in the tyre circumferential direction (not shown), for example.

It is preferred that a length (L2) in the tyre axial direction of the second portion 10 is 20% or more and 30% or less of the tread width (Tw), for example. The second portions 10 configured as such improve the drainage performance of the shoulder regions (sh) and the middle regions (Mi). The first portion 9 is formed to have a length (L1) in the tyre axial direction smaller than the length (L2) in the tyre axial direction of the second portion 10, for example.

Figure 4A:
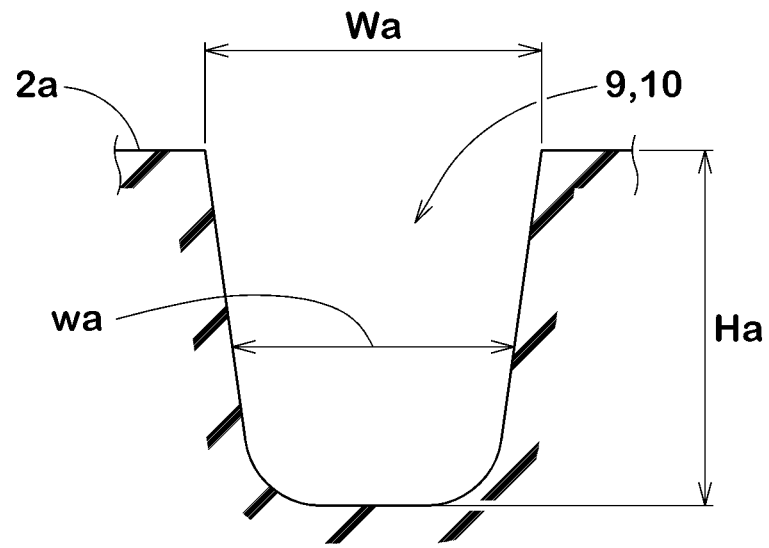
FIG. 4A a lateral cross-sectional view of a first portion and a second portion.

FIG. 4A is a lateral cross-sectional view of the second portion 10. As shown in FIG. 4A, the second portion 10 in the present embodiment has a portion in which a groove width (wa) is gradually decreased radially inwardly. In the second portion 10, the groove width (wa) is decreased from the ground contacting surface (2a) to a groove bottom thereof, for example. It is preferred that the first portion 9 has a similar lateral cross section (not shown) to the second portion 10.

In the first portions 9 and the second portions 10 configured as such, it is preferred that each of the groove widths (wa) at the ground contacting surface (2a) is 4.0 mm or more and 6.0 mm or less. It is preferred that each of groove depths (Ha) is 3.5 mm or more and 9.5 mm or less. In this specification, the groove width (wa) is an average value in the longitudinal direction of each of the portions 9 and 10.

As shown in FIG. 2, the third portions 11 are arranged so as to be in contact with a flat surface (not shown) when the tyre 1 is loaded with a tyre load of 1.5 kN with zero camber angle and in contact with the flat surface, for example. As a result, wear amounts of the crown region (Cr) and the middle regions (Mi) which are to be in contact with the ground during straightaway driving in a long driving time is decreased, therefore, the uneven wear resistance performance in the regions (cr) and (Mi) is effectively improved.

The third portions 11 in the present embodiment are provided in the middle regions (Mi). The middle regions (Mi) have smaller tyre circumferential lengths than that of the crown region (Cr) and are the regions in which slipping is likely to occur. Thereby, slipping in the middle regions (Mi) is suppressed, therefore, the wear is further decreased, thereby, the difference in the wear amount between the middle regions (Mi) and the crown region (Cr) is greatly decreased, therefore, uneven wear is suppressed.

As shown in FIG. 4, the third portion extends linearly, for example. The third portions 11 configured as such make water flow smoothly in the inclined grooves 8, therefore, the drainage performance is maintained high. In this specification, the term "linear" means not only that a pair of groove walls (20e) and (20i) extending in the longitudinal direction of the third portion 11 is each formed of only a straight line, but a pair of the groove walls (20e) and (20i) are each formed by an arc having a radius of curvature (r) of 200 mm or more, for example. It is not preferred that the third portion 11 extends in a zigzag shape or a wavy shape, for example. Both groove walls (20e) and (20i) of the third portion 11 extend in parallel with each other, for example.

It is preferred that a length (L3) (shown in FIG. 4) in the tyre axial direction of the third portion 11 is 5% or more of the tread width (Tw). The third portions 11 configured as such maintain the tread rigidity of the middle regions (Mi) high, therefore, excellent uneven wear resistance performance is exerted. In order to suppress decrease in the drainage performance, it is preferred that the lengths (L3) of the third portions 11 are each 15% or less of the tread width (Tw).

In the present embodiment, the groove wall (20e) on one side of the third portion 11 is connected with a groove wall (21e) on one side of the first portion 9 and a groove wall (22e) on one side of the second portion 10 so as to each form a straight line. Thereby, smooth flow of water in the inclined grooves 8 is further ensured, therefore, the drainage performance is further improved. Furthermore, a decrease in the tread rigidity in the vicinity of the inclined grooves 8 is suppressed. It should be noted that the groove wall (20e) on one side of the third portion 11 may be connected with only one of the groove wall (21e) on one side of the first portion 9 and the groove wall (22e) on one side of the second portion 10 (not shown).

The groove wall (20e) on one side is arranged on the toe-side in a tyre rotational direction (R), for example. In this case, the flow of water in the inclined grooves 8 becomes smoother, therefore, high drainage performance is exerted.

In the present embodiment, the groove wall (20i) on the other side of the third portion 11 is connected in a bent manner with a groove wall (21i) on the other side of the first portion 9 and a groove wall (22i) on the other side of the second portion 10. As just described, in the present embodiment, while making the groove width (wb) of the third portion 11 small, the tread rigidity of at least the region adjacent to the groove wall (20e) on one side is maintained high, therefore, the uneven wear resistance performance is improved. The third portion 11 is connected with a gradually decreasing portion (9a) in which the groove width (wa) of the first portion 9 gradually decreases toward the third portion 11, and a gradually decreasing portion (10a) in which the groove width (wa) of the second portion 10 gradually decreases toward the third portion 11, for example. It should be noted that the groove wall (20i) on the other side of the third portion 11 may be connected with the groove wall (21i) on the other side of the first portion 9 and the groove wall (22i) on the other side of the second portion 10 in a smooth arc shape (not shown). Further, the groove wall (20e) on one side may be connected with the groove walls (21e) and (22e) on one side in a bent manner, and the groove wall (20i) may be connected with the groove walls (21i) and (22i) on the other side in a bent manner or in an arc shape (not shown).

It is preferred that an angle θ3 of the third portion 11 with respect to the tyre circumferential direction is 20 degrees or more and 40 degrees or less, for example.

As shown in FIG. 2, in terms of the groove width, it is preferred that the third portion 11 is 60% or less of the first portion 9 and the second portion 10. The third portion 11 configured as such effectively suppresses slippage when the first portion 9 and the second portion 10 are in contact with the ground. If the groove width (wb) of the third portion 11 is excessively small, the smooth flow of water in the inclined grooves 8 is hindered, therefore, it is possible that the drainage performance is deteriorated. Thereby, in terms of the groove width, it is preferred that the third portion 11 is 30% or more of the first portion 9 and the second portion 10.

In particular, it is preferred that the groove width (wb) of the third portion 11 is 4 mm or less. Therefore, the groove walls (20e) and (20i) of the third portion 11 come into contact with each other to support each other upon contacting the ground, thereby, slippage is further suppressed. Therefore, the uneven wear resistance performance is improved.

In terms of the groove width, it is preferred that the third portion 11 is 80% or more and 120% or less of the first portion 9 and the second portion 10. The third portion 11 configured as such maintains a smooth flow of water in the inclined grooves 8 and suppresses a decrease in the uneven wear resistance performance. A groove depth (Hb) (shown in FIG. 4B) of the third portion 11 of the present embodiment is the same as the groove depths (Ha) of the first portion 9 and the second portion 10.

In terms of the groove volume per area of the ground contacting surface (2a), it is preferred that the third portion 11 is 20% or more of the first portion 9 and the second portion 10. Further, it is preferred that the third portion 11 is 60% or less of the first portion 9 and the second portion 10. Thereby, the effects described above are effectively exerted.

Figure 4B:
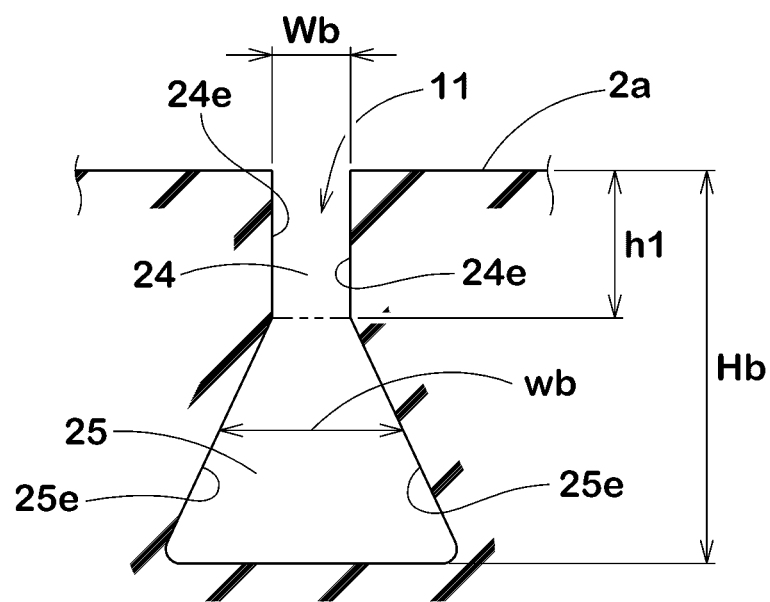
FIG. 4B a lateral cross-sectional view of a third portion.

FIG. 4B is a lateral cross-sectional view of the third portion 11. As shown in FIG. 4B, the third portion 11 in the present embodiment has a lateral cross section formed in a flask shape. The third portion 11 includes an outer portion 24 arranged on a ground contacting surface (2a) side and an inner portion 25 arranged radially inside the outer portion 24 and having a groove width (wb) larger than the outer portion 24, for example. In the third portion 11 configured as such, the inner portion 25 suppresses a decrease in the drainage performance while the outer portion 24 increases the tread rigidity. It is preferred that a depth (hl) of the outer portion 24 is 30% or more and 50% or less of the groove depth (Hb) of the third portion 11.

In the outer portion 24 of the present embodiment, both groove walls (24e), (24e) extend along normal lines respectively. Both of the groove walls (24e), (24e) in the present embodiment extend in parallel with each other. The normal line mentioned above is a straight line orthogonal to the tangent of the ground contacting surface (2a) at the intersection of the groove wall (24e) and the ground contacting surface (2a). In the inner portion 25 of the present embodiment, both groove walls (25e), (25e) extend radially outwardly in a tapered shape. Thereby, the effects described above are exerted effectively.

Figure 5:
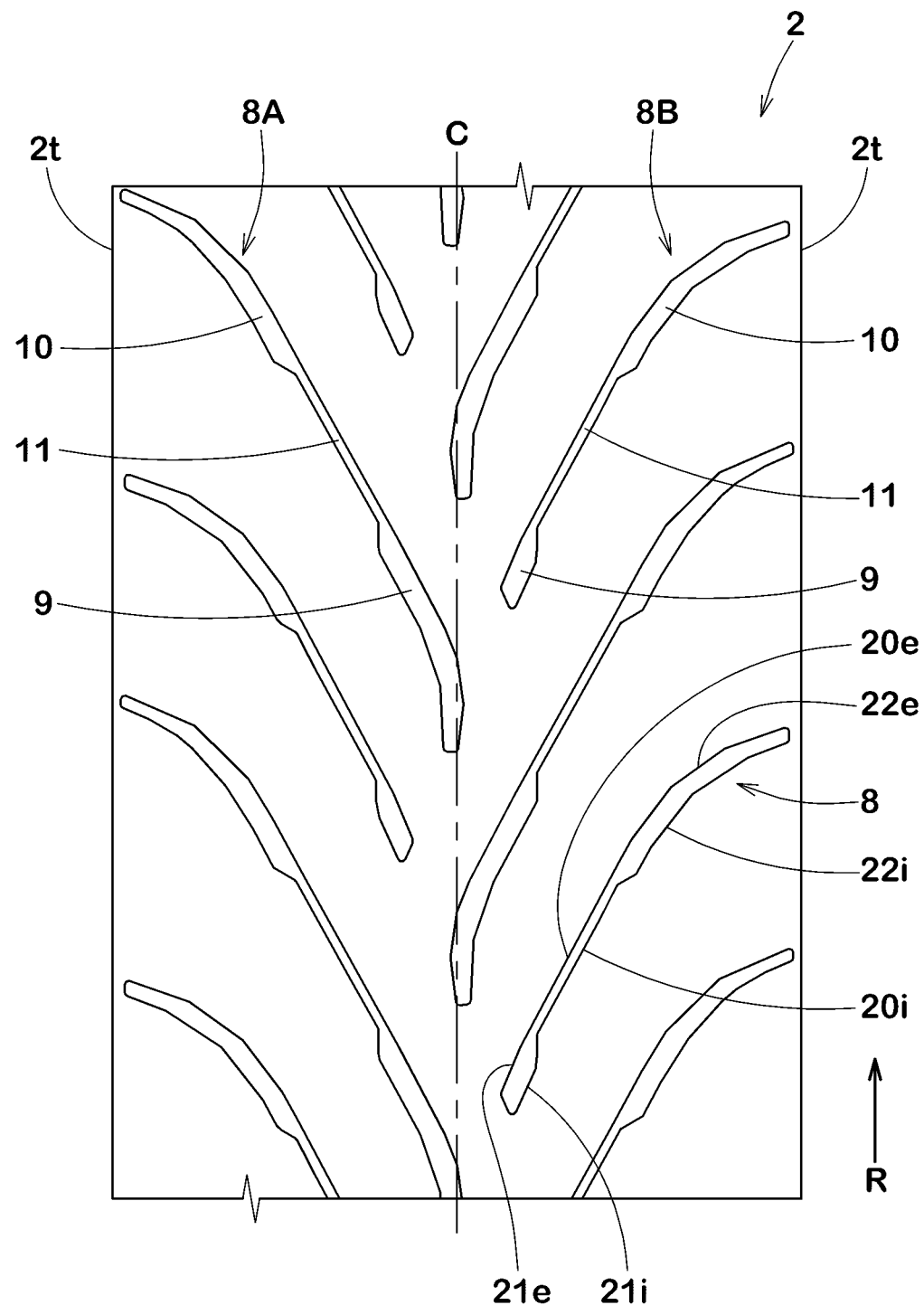
FIG. 5 a development view of the tread portion according to another embodiment.

FIG. 5 is a development view of the tread portion 2 according to another embodiment. The same components as those in the present embodiment are denoted by the same reference numerals, and the description thereof may be omitted. As shown in FIG. 5, the groove wall (20e) on one side may be arranged on a heel-side in the tyre rotational direction (R), for example. In this case, deformation of the groove wall (20i) on the other side at the time of contacting the ground is suppressed, therefore, contact between both groove walls (20e) and (20i) is effectively achieved. It should be noted that the rotational direction of the tyre 1 may be an opposite direction to FIG. 3 and FIG. 5.

Figure 6A:
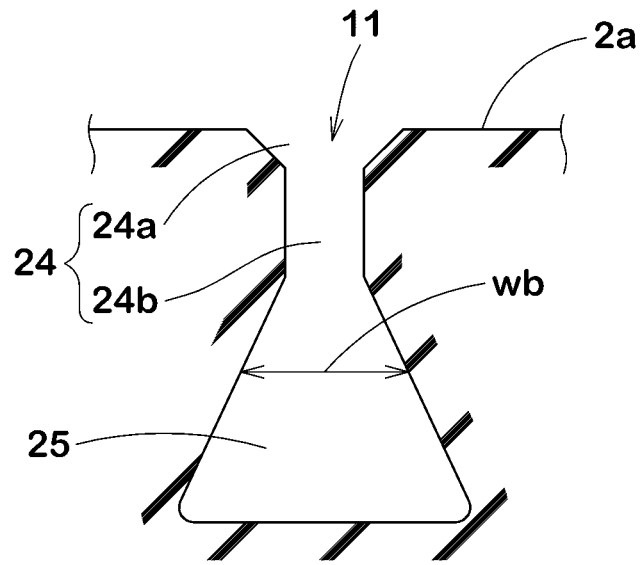
FIG. 6A a lateral cross-sectional view of the third portion according to another embodiment.
Figure 6B:
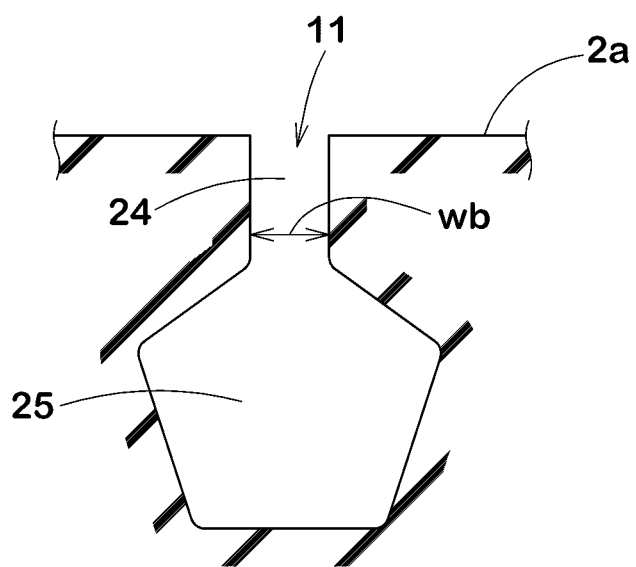
FIG. 6B a lateral cross-sectional view of the third portion according to yet another embodiment.

FIG. 6A is a lateral cross-sectional view of the third portion 11 according to another embodiment, and FIG. 6B is a cross-sectional view of the third portion 11 according to yet another embodiment. The same components as those of the third portion 11 of the present embodiment are denoted by the same reference numerals and description thereof is omitted.

As shown in FIG. 6A, the third portion 11 of the present embodiment includes a first outer portion (24a) in which the groove width (wb) is decreased radially inwardly and a second outer portion (24b) connected with the first outer portion (24a) and having the constant groove width (wb). A groove width of the first outer portion (24a) is formed to be smaller than the groove width of the inner portion 25, and a groove depth of the first outer portion (24a) is formed to be smaller than a groove depth of the second outer portion (24b). The outer portion 24 configured as such smoothly discharges more water than the outer portion 24 of the present embodiment and maintains the tread rigidity.

As shown in FIG. 6B, in the third portion 11 of this embodiment, the inner portion 25 is formed to have a pentagonal cross section. The third portion 11 configured as such exert the effects described above as well. It should be noted that the third portion 11 is not limited to such a configuration, and the inner portion 25 may be circular or elliptical, for example.

While detailed description has been made of the tyre according to an embodiment of the present invention, the present invention can be embodied in various forms without being limited to the illustrated embodiment.

WORKING EXAMPLES (EXAMPLES)

Tyres having the basic structure shown in FIG. 1 and the basic tread pattern shown in FIG. 2 were made by way of test, and each of the test tyres was tested for the uneven wear resistance performance and the drainage performance. Common specifications of the test tyres and the test methods were as follows.

<Uneven Wear Resistance Performance>

Each of the test tyres was mounted on a front wheel of a motorcycle. A test rider drove the motorcycle on a dry asphalt road surface of a circuit course. After the test drive, wear amounts of the inclined grooves were measured and a difference between the wear amount in the crown region and the wear amount in the middle region was calculated. The results are indicated by an index based on Reference 1 being 100. The smaller numerical value shows more excellent uneven wear resistance performance.

Tyre size: 120/70ZR17 (front wheel), 200/55ZR17 (rear wheel)

Rim size: MT3.50×17 (front wheel), MT6.00×17 (rear wheel)

Tyre inner pressure: 250 kPa (front wheel), 290 kPa (rear wheel)

Displacement: 1000 cc

Driving distance: 5000 km

Average speed: 120 km/h

All the tyres mounted on the rear wheel had the same specifications.

Cross-sectional shape of Third portion: FIG. 4B

Groove volume of Third portion/Groove volume of First portion are per unit area.

<Drainage Performance>

By using an inside drum testing machine having a well-known structure with a diameter of 3 meters, braking force was measured while each of the test tyres was run on a drum surface covered by 5.0 mm depth of water. The braking force was measured twice when the drum rotational speed was 100 km/h and 70 km/h, then a difference between them was calculated to obtain the braking force. The results were indicated by an index based on the difference of the braking force of the Reference 1 being 100. The smaller the numerical value, the higher the braking force during running on a wet surface, which shows more excellent drainage performance.

Tyre size: 120/70ZR17

Longitudinal load: 1.5 kN

Tyre inner pressure: 250 kPa

The test results are shown in Table 1.

TABLE 1

| | Reference 1 | Example 1 | Example 2 | Reference 2 |
|---|---|---|---|---|
| Figure showing shape of Tread portion | FIG. 2 | FIG. 2 | FIG. 5 | FIG. 2 |
| Presence or Absence of Third portion | Absence | Presence | Presence | Presence |
| Groove volume of Third portion/ Groove volume of First portion [%] | — | 50 | 50 | 50 |
| Ratio (Wb/Wa) [%] | — | 40 | 40 | 40 |
| Ratio (Hb/Ha) [%] | — | 100 | 100 | 100 |
| Ratio (L3/TW) [%] | — | 10 | 10 | 10 |
| Terminating position of second portion | Shoulder Region | Shoulder Region | Shoulder Region | Middle region |
| Uneven wear resistance performance [index: smaller numerical value is better] | 100 | 80 | 82 | 80 |
| Drainage performance [index: smaller numerical value is better] | 100 | 100 | 100 | 115 |

From the test results, it can be confirmed that, in the tyres in Examples, the uneven wear resistance performance was improved while the drainage performance was maintained compared with the tyres in the References.

DESCRIPTION OF REFERENCE SIGNS 1 tyre
2 tread portion
8 inclined groove
9 first portion
10 second portion
11 third portion
Cr crown region
sh shoulder region

The invention claimed is:

1. A tyre comprising a tread portion, wherein
the tread portion is provided with a plurality of inclined grooves inclined with respect to a tyre circumferential direction,
each of the inclined grooves extends from a crown region to a shoulder region,
each of the inclined grooves consists of a first portion arranged on the crown region side, a second portion arranged on the shoulder region side, and a third portion connecting the first portion and the second portion,
the first portion has a groove width gradually decreasing from a lengthwise center thereof to both ends thereof,
the second portion has a groove width gradually decreasing from a lengthwise center thereof to both ends thereof,
the third portion extends linearly over an entire length thereof at a constant groove width,
the constant groove width of the third portion is smaller than the groove width of the whole first portion except both ends thereof and the whole second portion except both ends thereof,
the first portion, the second portion, and the third portion are inclined to the same side with respect to the tyre circumferential direction, and
a length in a tyre axial direction of the first portion is smaller than a length in the tyre axial direction of the second portion.

2. The tyre according to claim 1, wherein the third portion is arranged, when the tyre is placed on a flat surface and loaded with a tyre load of 1.5 kN with zero camber angles, so as to be in contact with the flat surface.

3. The tyre according to claim 1, wherein in terms of a groove volume per unit area, the third portion is 20% or more and 60% or less of the first portion and the second portion.

4. The tyre according to claim 1, wherein in terms of the groove width, the third portion is 60% or less of the first portion and the second portion.

5. The tyre according to claim 1, wherein in terms of a groove depth, the third portion is 80% or more and 120% or less of the first portion and the second portion.

6. The tyre according to claim 1, wherein a length in a tyre axial direction of the third portion is 5% or more of a tread width.

7. The tyre according to claim 1, wherein a length in the tyre axial direction of the second portion is 20% or more and 30% or less of a tread width.

8. The tyre according to claim 1, wherein
the second portion is formed by a plurality of linear portions extending linearly and connected successively, and
among the linear portions, the axially outer linear portion has a larger angle with respect to the tyre circumferential direction.

9. The tyre according to claim 1, wherein the third portion includes an outer portion arranged on a ground contacting surface side and an inner portion arranged radially inside the outer portion and having a groove width larger than the outer portion.

10. The tyre according to claim 9, wherein a depth of the outer portion is 30% or more and 50% or less of a groove depth of the third portion.

11. The tyre according to claim 1, wherein a groove wall on one side in the tyre circumferential direction of the third portion is connected with a groove wall on one side in the tyre circumferential direction of the first portion and a groove wall on one side in the tyre circumferential direction of the second portion in a straight line or in a bent manner.

12. The tyre according to claim 11, wherein the groove wall on one side is arranged on a toe-side in a tyre rotational direction.

13. The tyre according to claim 11, wherein the groove wall on one side is arranged on a heel-side in a tyre rotational direction.

14. The tyre according to claim 1, wherein the inclined grooves include at least one first inclined groove and at least one second inclined groove having a length smaller than the first inclined groove.

15. The tyre according to claim 14, wherein the first portion of the first inclined groove reaches a tyre equator and the first portion of the second inclined groove does not reach the tyre equator.

16. The tyre according to claim 14, wherein
the inclined grooves include a plurality of the first inclined grooves and a plurality of the second inclined grooves, and
the first inclined grooves and the second inclined grooves are arranged alternately in the tyre circumferential direction.

17. The tyre according to claim 14, wherein
an inner end of the first inclined groove is located on the tyre equator, and
a distance in the tyre axial direction between an inner end of the second inclined groove and the tyre equator is 5% or more and 10% or less of a tread width.

18. The tyre according to claim 14, wherein the first portion of the first inclined groove has a length greater than the first portion of the second inclined groove.

19. The tyre according to claim 14, wherein
the first portion of the first inclined groove is inclined so as to have an angle gradually increasing axially outwardly with respect to the tyre circumferential direction, and
the first portion of the second inclined groove has a groove wall on one side in the tyre circumferential direction extending linearly over an entire length thereof except an axially inner end thereof.

20. A tyre comprising a tread portion, wherein
the tread portion is provided with a plurality of inclined grooves inclined with respect to a tyre circumferential direction,
each of the inclined grooves extends from a crown region to a shoulder region,
each of the inclined grooves consists of a first portion arranged on the crown region side, a second portion arranged on the shoulder region side, and a third portion connecting the first portion and the second portion,
the first portion has a groove width gradually decreasing from a lengthwise center thereof to both ends thereof,
the second portion has a groove width gradually decreasing from a lengthwise center thereof to both ends thereof,
the third portion extends linearly over an entire length thereof at a constant groove width,
the constant groove width of the third portion is smaller than the groove width of the whole first portion except both ends thereof and the whole second portion except both ends thereof,
the first portion, the second portion, and the third portion are inclined to the same side with respect to the tyre circumferential direction, and
a length in the tyre axial direction of the second portion is 20% or more and 30% or less of a tread width.

* * * * *